Dec. 5, 1972 C. DOUGHERTY 3,705,009
HEAT RECYCLING FOR AMMONIA PREPARATION
Filed June 12, 1970 5 Sheets-Sheet 1

INVENTOR
Charles Dougherty
BY Charles L. Harness
ATTORNEY

LOW TEMPERATURE SHIFT CONVERSION & SYNTHESIS GAS PURIFICATION

INVENTOR
Charles Dougherty
BY Charles L. Harness
ATTORNEY

POWER GENERATION; STEAM & CONDENSATE BALANCE

INVENTOR
Charles Dougherty
BY Charles L. Harness
ATTORNEY

United States Patent Office 3,705,009
Patented Dec. 5, 1972

3,705,009
HEAT RECYCLING FOR AMMONIA
PREPARATION
Charles Dougherty, Memphis, Tenn., assignor to W. R.
Grace & Co., New York, N.Y.
Filed June 12, 1970, Ser. No. 45,685
Int. Cl. C01c 1/04; B01j 9/00
U.S. Cl. 423—361
3 Claims

ABSTRACT OF THE DISCLOSURE

Ammonia synthesis gas is charged to the ammonia converter under high pressure using reciprocating compressors driven by electric motors using electricity derived from steam turbines, which in turn use steam deriving from heat deriving mainly from primary and secondary reformers, shift converters, and ammonia converter in the ammonia synthesis gas preparation. The product ammonia is recovered as liquid by cooling the effluent from the converter with liquid water.

Figure 1:
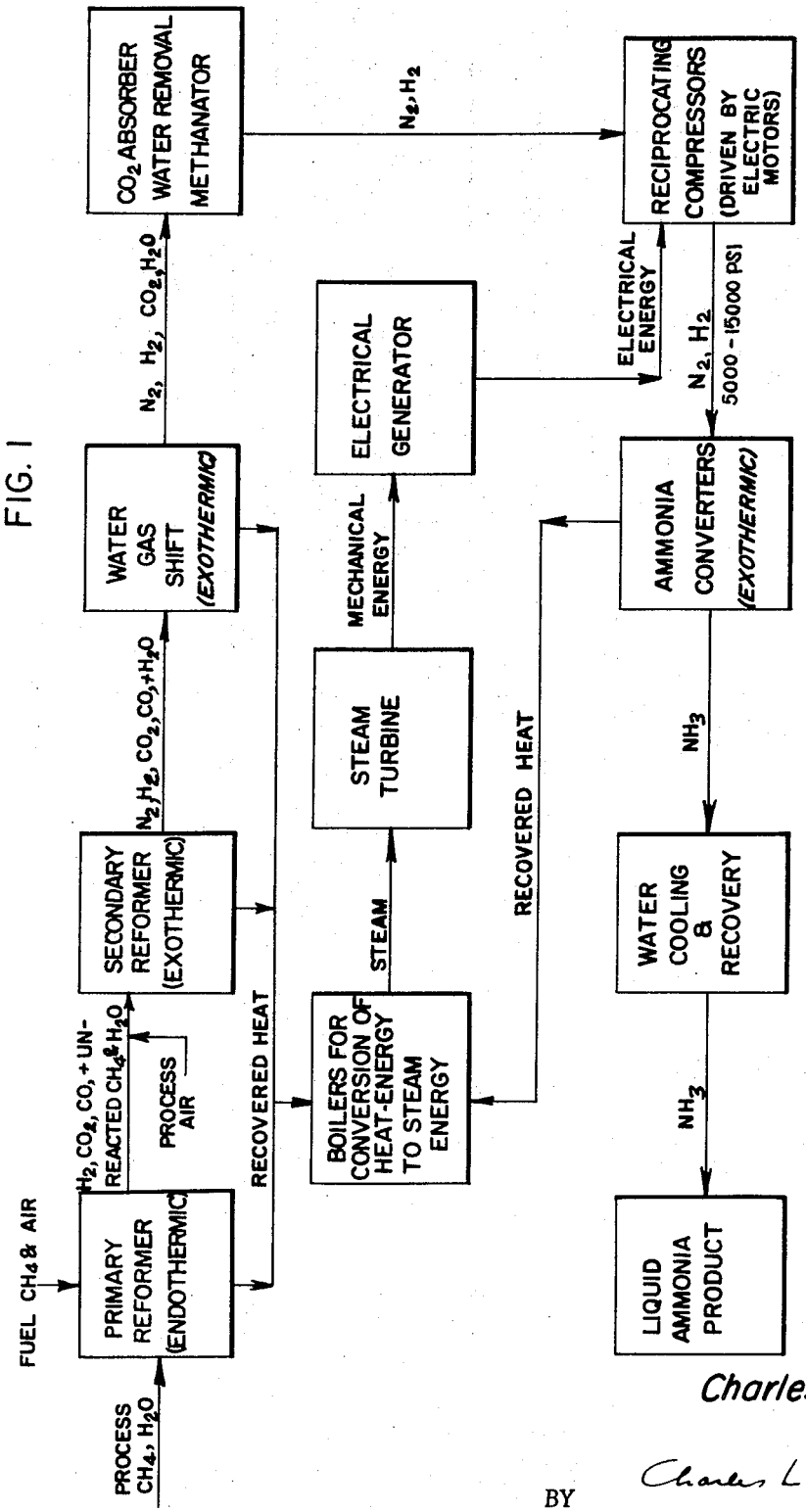

In recent years a number of giant-capacity ammonia plants have been built using centrifugal compressors for delivering synthesis gas to the ammonia converter. These plants make ammonia very cheaply and in some areas have provided serious economic competition to older and smaller plants not designed for use with such centrifugal compressors. The critical commercial advantage of the instant invention is that it can be used to modify and/or modernize ammonia plants that might otherwise find it difficult to compete with the new giant plants using centrifugal compressors. This result is attained by reason of the fact that all or substantially all of the power, heat, and energy requirements throughout the process are supplied by heat and/or power and/or energy exchange systems within the process itself. In consequence, the only outside energy requirement is the heat requirement of the primary reformer. This being supplied, the overall system is thereafter self-sufficient.

The process is based on steam reforming methane Generally methane or natural gas is used in the United States because of the low cost and availability. In other countries, naphtha or heavier hydrocarbons are commonly used as a feed material. This invention will work equally well with hydrocarbon feed stocks heavier than methane. "Methane" as used herein includes such methane equivalents.

In the drawings:

FIG. 1 is a simplified schematic process diagram of an ammonia process using steam-methane reforming, and shows the basic mode of recovery of heat energy from primary and secondary reformers, shift converters, and ammonia converter and its conversion to electrical energy for driving synthesis gas reciprocating compressors.

Figure 2:
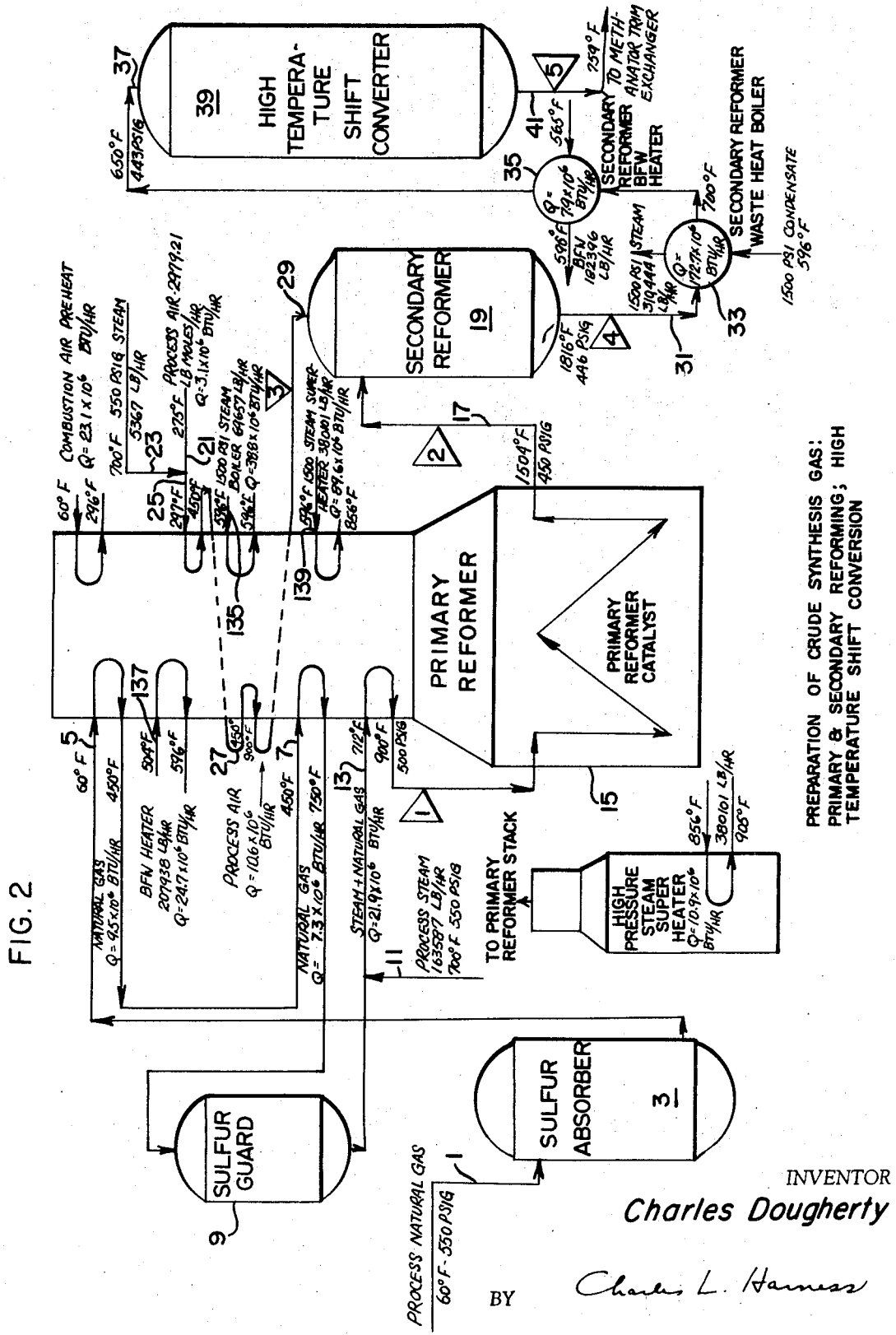
Figure 3:
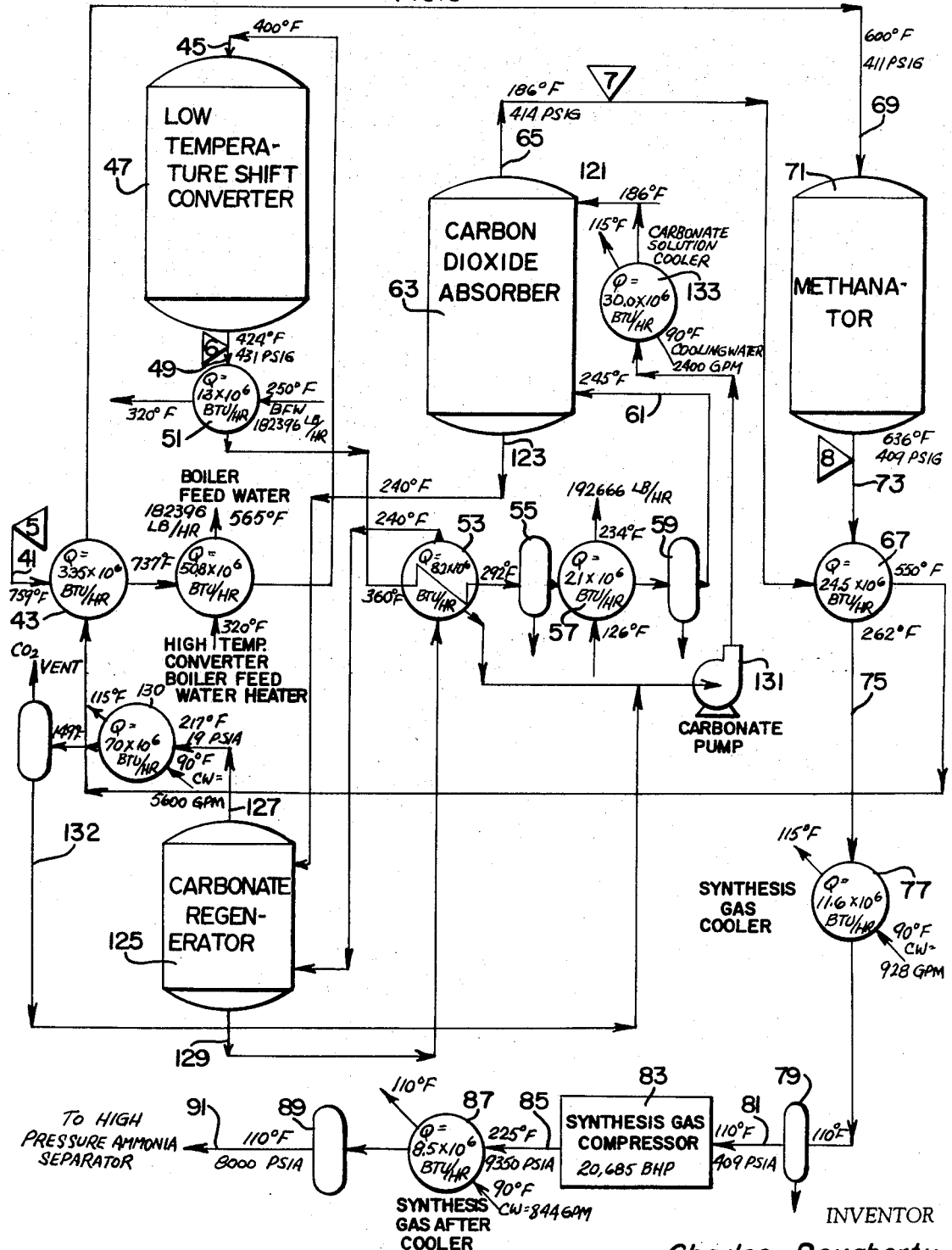
Figure 4:
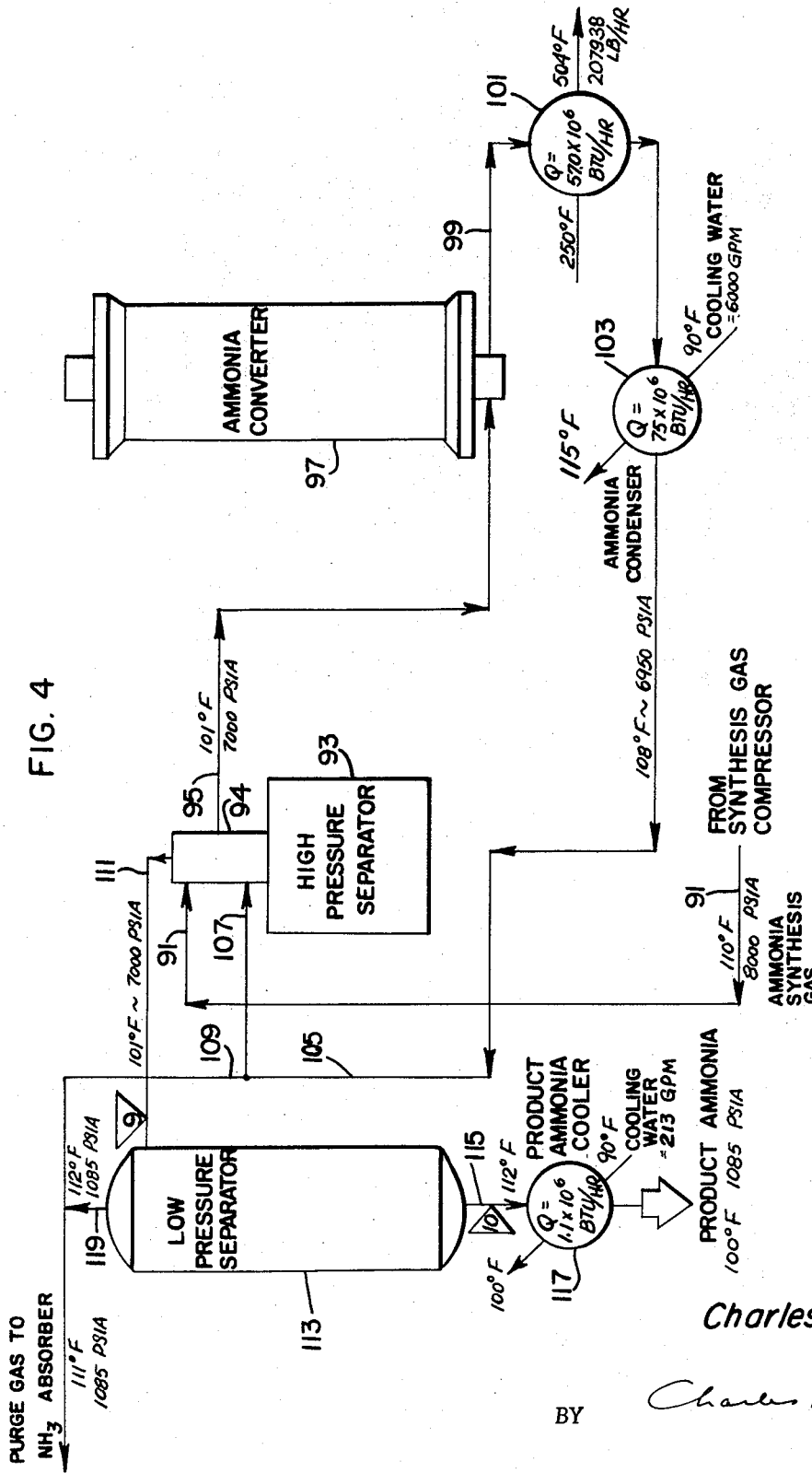

FIGS. 2, 3, and 4 show in sequential detail the ammonia process flow of FIG. 1. In particular, FIG. 2 shows the beginning of the process, starting with incoming natural gas and steam, and takes the process through the high temperature water gas shift converter.

FIG. 3 continues the process and takes it from the low temperature water gas shift converter to the synthesis gas compressor. FIG. 4 continues the process and takes the compressed synthesis gas through the converter and to ammonia product recovery.

Figure 5:
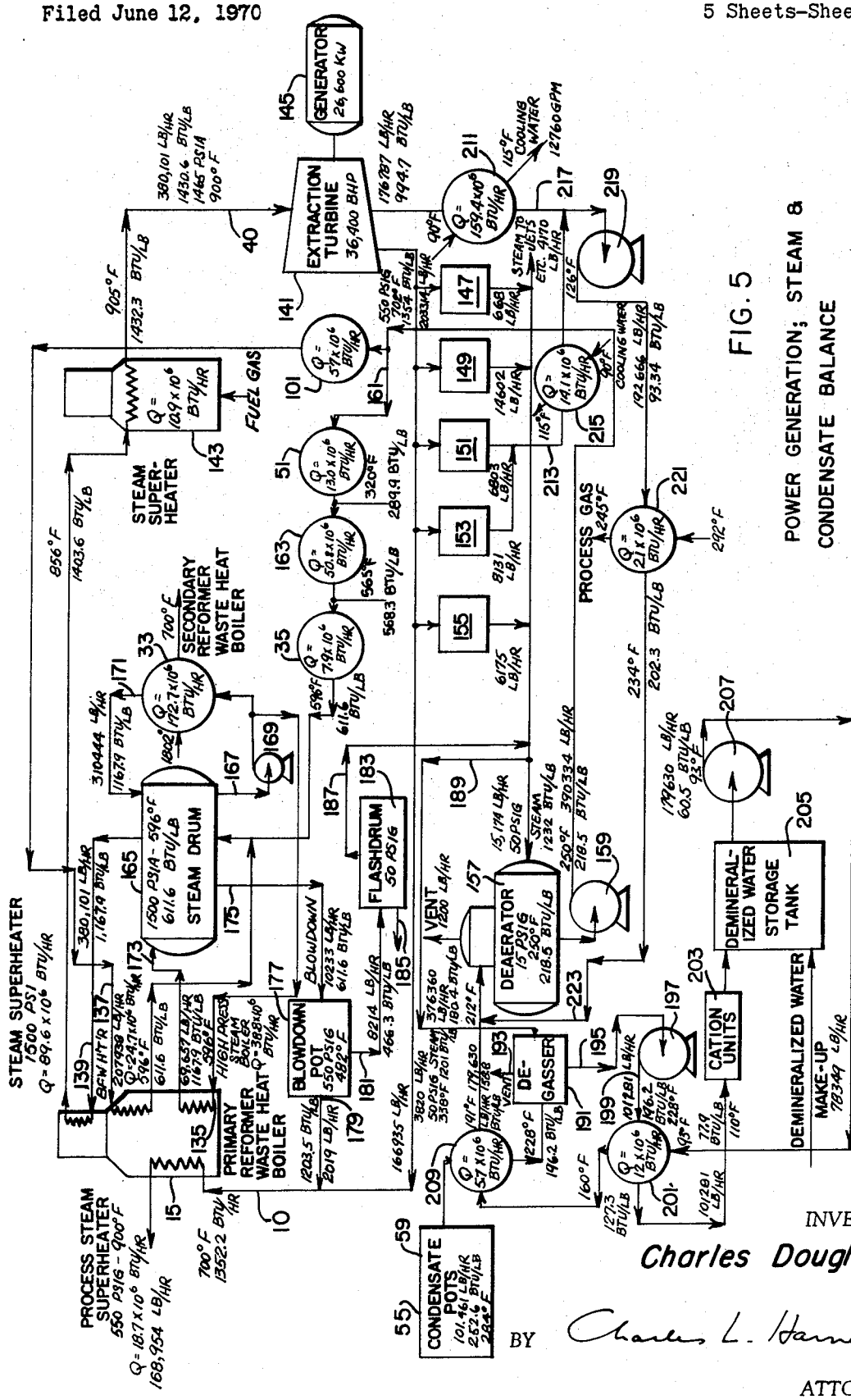

FIG. 5 shows the steam and condensate balances and electrical energy generation associated with all of the pertinent unit steps and processes in FIGS. 2–4.

It is well-known that ammonia synthesis at high pressures of the order of 5,000–15,000 p.s.i. has a marked advantage and a marked disadvantage. The advantage is that, owing to the high pressure, the ammonia produced in the converter may be recovered as liquid simply by cooling the effluent with liquid water, e.g., 90° F. water. In contrast, in systems operating at lower pressures, e.g., about 2,000 p.s.i., the ammonia in the recirculating stream must be refrigerated to liquefy it, and the required refrigeration is expensive. The disadvantage of the use of pressures of the order of 5,000–15,000 p.s.i. is that reciprocating compressors are required to produce the high pressures. Such compressors are usually driven by electrical motors and in the past have required large expenditures for the purchase of electrical energy. The instant invention retains the advantage of recovery with water cooling, while avoiding the disadvantage of purchasing electrical power. This is accomplishing by recovering substantially all the heat applied to the primary reformer (but not consumed there in the endothermic steam-methane primary reforming step) as well as the heat developed in the exothermic reactions taking place in the secondary reformer, in the water gas shift operation, and in the ammonia converter, and then converting the extracted heat first to steam, using the steam to run a steam turbine, using the mechanical energy developed by the steam turbine to run an electric generator, and finally using that electric energy to run the reciprocating compressors charging the synthesis gas into the converter.

PRIMARY REFORMING

Steam reforming involves two principal hydrogen-forming reactions. One of these is highly endothermic, and the other is exothermic. The overall heat balance is endothermic.

The reactions (at 60° F. and zero pressure) are:

(1) $CH_4 + H_2O \rightarrow CO + 3H_2$;

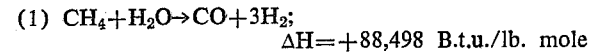

Part of the thus formed CO is further oxidized.

(2) $CO + H_2O \rightarrow CO_2 + H_2$;

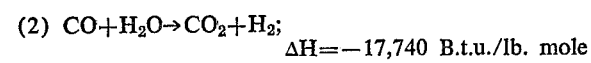

Also, apparently some of the methane can be oxidized directly to $CO_2$:

(3) $CH_4 + 2H_2O \rightarrow CO_2 + 4H_2$;

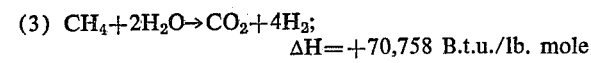

It will be evident that the heat requirement will be within the range of +70,758 to +88,498 B.t.u./lb. mole of process $CH_4$ (or its hydrocarbon equivalent), depending on the $CO:CO_2$ ratio desired in the effluent. Actually, in commercial practice it has been necessary to supply several times this amount of heat (e.g., by burning natural gas in air) to achieve the high reaction velocities and temperatures necessary for large scale commercial practice. In past practice, in large degree, this excess heat has been wasted. In this invention it is recovered and converted to useful electrical energy for use in attaining high pressures in the ammonia converter.

For efficient operation of the primary reformers, it is necessary to preheat the reactants to a temperature in the range of 300–1200° F. Ordinarily this heat is supplied by burning a conventional fuel (e.g., natural gas) in air. As has been stated, the overall primary reforming reaction is endothermic; however, more than twice the theoretical endothermic amount of heat must be supplied to the reformer in order to bring about the reaction, and it is the disposition of this heat, plus the heat available from the secondary reformer and from other unit processes of the synthesis gas formation that constitutes this invention. As has been noted, a large portion of this heat is used ultimately to drive reciprocating compressors to pressurize the ammonia converter to pressures of 5000–15,000 p.s.i. A complete breakdown of primary reformer duty is given in Table 1.

TABLE 1

Primary reformer duty

|   | Million B.t.u./hr. |
|---|---|
| Radiant loss | 9.3 |
| Catalyst section | 209.2 |
| Process steam superheater | 18.7 |
| 1500 p.s.i. steam superheater [1] | 100.5 |
| Total natural gas | 20.6 |
| Total process air | 13.1 |
| 1500 p.s.i. steam boiler | 38.8 |
| Boiler feed water heater | 24.7 |
| Combustion air preheater | 23.1 |
| Total | 458.0 |

[1] Includes $10.9 \times 10^6$ B.t.u./hr. absorbed in auxiliary or trim high pressure steam superheater. This item may be installed as a separate item or designed as an integral part of the primary reformer convection section.

The stoichiometry for the reactions in the primary reformer (using the feed stream of FIG. 2) is substantially (in pound-moles):

(4) 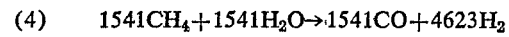
$$1541 CH_4 + 1541 H_2O \rightarrow 1541 CO + 4623 H_2$$

(5) 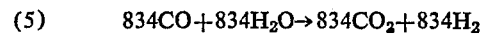
$$834 CO + 834 H_2O \rightarrow 834 CO_2 + 834 H_2$$

(6) Summary

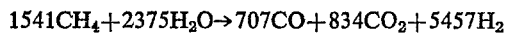
$$1541 CH_4 + 2375 H_2O \rightarrow 707 CO + 834 CO_2 + 5457 H_2$$

SECONDARY REFORMER

Here, air is introduced to provide nitrogen (see FIG. 2) and to furnish oxygen to burn methane to carbon oxides, hydrogen, and water. There are several simultaneous reactions, but these may be summarized for the specific streams used in FIG. 2 substantially as follows:

(7) 
$$582 CH_4 + 624 O_2 \rightarrow 514 CO + 68 CO_2 + 566 H_2 + 598 H_2O$$

WATER GAS SHIFT

As shown in FIGS. 2–3, the water gas shift operation takes place in two stages, a high temperature shift conversion and a low temperature shift conversion. Both are exothermic and can be summarized (having reference to Streams 4 and 6) by the following stoichiometry, in pound moles:

(8) 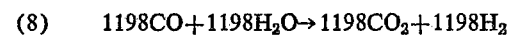
$$1198 CO + 1198 H_2O \rightarrow 1198 CO_2 + 1198 H_2$$

The effluent from the water gas shift reactor must be treated to remove its content of carbon dioxide. The particular system used is not critical and in fact several systems well-known in the synthesis gas art can be used in carrying out the process of this invention. Typical for ammonia plants that use steam-methane primary reforming are the recovery systems using ethanolamines and/or potassium carbonate. Both of these systems are conventional and are described, for example in Kirk-Othmer Encyclopedia of Chemical Technology, Second Edition, Volume 2, pages 277–280. Other systems are also operable, for example the water scrubbing process, ibid; 278. The system described below uses potassium carbonate.

Carbon monoxide is detrimental to the ammonia catalyst and should be removed before the synthesis gas is sent to the ammonia converter. There are several useful ways of accomplishing this. One system is to absorb the carbon monoxide in a cuprous ammoniacal solution. Another is to hydrogenate it back to methane by the so-called methanation process, as used herein. Still another suitable process, particularly useful in plants that have air separation units, is the so-called nitrogen wash process. All of these are well-known and are described for example, ibid; pages 280–282. All are operable in the process of this invention.

THE SYNTHESIS GAS PUMP

A reciprocating compressor is required to attain the pressures of 5,000–15,000 p.s.i. necessary for the operation of the invention. Centrifugal compressors have been used in ammonia plants in the past to pump synthesis gas into the converter, and such compressors have been powered by waste steam available from heat-generating areas of the process, such as the primary and/or secondary reformers. However, such compressors have not been designed to operate at all at pressures above about 4,500 p.s.i. Most of the centrifugal compressors used in ammonia plants operate at 2,000–3,000 p.s.i. because the larger volume at the lower pressure meets requirements for equipment already developed. Each of the three general types of reciprocating compressors (piston, plunger, and diaphragm) is operable in this invention. However, the piston type is preferred for reasons of economy and efficiency. Compressor capacity should, of course, be correlated with volume of synthesis gas to be pumped. The weight of synthesis gas in the specific embodiment described herein (about 90,000 pounds an hour) is conveniently handled by compressors aggregating about 36,000 horsepower, as follows: 3–3,000 H.P.; 2–4,000 H.P.; 2–4,500 H.P.; and 1–10,000 H.P.

With reference to FIG. 1, heat is applied to the primary reformer by burning natural gas or other carbonaceous fuel. In the particular instance which is exemplified further in the text and set out in detail in FIGS. 2–5, a total of 479,600,000 B.t.u. per hour are provided in the primary reformer by burning natural gas in air. Also in an hour's time, 2,144 lb. mole of methane (and the term as used herein includes methane equivalents) was sent through the catalyst chamber in the primary reformer with the proper amount of steam. The total amount of heat applied to a given primary reformer when using this invention will vary in accordance with the size and efficiency of the plant. However, in this particular instance, 220,000 B.t.u.'s per pound mole of process methane were provided. A suitable range is 200,000–300,000 B.t.u.'s per pound mole of process methane.

About 50 percent of the heat delivered to the primary reformer is recovered for use in heat exchange mechanisms in other areas in the herein-described ammonia process. The remainder is consumed in the endothermic reaction of the primary reforming operation and in radiation losses. A complete break-down of Primary Reformer duty is given in Table 1, above.

TABLE 2.—AMMONIA PROCESS STREAM COMPOSITIONS

| | Stream number | | | | | | | | | | |
|---|---|---|---|---|---|---|---|---|---|---|---|
| | Pound, moles/hour | | | | | | | | | | |
| | 1 | 2 | 3 | 4 | 5 | 6 | 7 | 8 | 9 | 10 | 11 |
| Stream component | Primary reformer feed | Primary reformer effluent | Air to secondary | Secondary reformer effluent | High temperature shift effluent | Low temperature shift effluent | $CO_2$ absorber effluent | Methanator effluent | High pressure separator product (liquid) | Low pressure separator product | Purge gas |
| $CH_4$ | [1] 2,144 | 603.29 | | 20.92 | 20.92 | 20.92 | 20 92 | 49.02 | 26.6 | 11.62 | 36.86 |
| $CO_2$ | 19.59 | 854.05 | | 921.76 | 1,913.74 | 2,119.50 | 4.78 | | | | |
| $N_2$ | 10.42 | 10.42 | 2,327.03 | 2,337.45 | 2,337.45 | 2,337.45 | 2,337.45 | 2,327.45 | 33.62 | 2.84 | 104.69 |
| $H_2$ | | 5,367.04 | | 5,933.29 | 6,925.26 | 7,131.93 | 7,110.03 | 7,020.95 | 102.54 | 18.05 | 314.07 |
| CO | | 707.41 | | 1,221.06 | 229.09 | 23.32 | 23.32 | | | | |
| $AR_2$ | | | 27.91 | 27.91 | 27.91 | 27.91 | 27.91 | 27.91 | 7.35 | 2.36 | 25.34 |
| $O_2$ | | | 624.27 | | | | | | | | |
| $NH_3$ | | | | | | | | | 4,368.01 | 4,316.28 | 87.22 |
| $H_2O$ | 9,080.62 | 6,705.28 | 297.92 | 7,601.68 | 6,609.70 | 6,403.94 | 166.40 | 199.28 | | | |
| ° F./p.s.i.g | 900/500 | 1,504/450 | 900/460 | 1,816/446 | 759/439 | 424/431 | 186/414 | 636/409 | 110/1,085 | 112/1,085 | 111/1,085 |

[1] Includes minor amounts of lower alkanes recalculated to methane equivalent; e.g., 1 mole ethane equivalent to 2 moles methane.
[2] Rare gasses, mostly argon.

As shown in FIG. 1, the overall process in the primary reformer is endothermic. A total of 479,600,000 B.t.u.'s per hour or 223,694 B.t.u.'s per pound mole of process methane are provided in the primary reformer by burning natural gas in air. The overall reaction as indicated in Equation 6 above, consumes about 57,000 B.t.u.'s per pound mole (based on 60° F. and zero pressure) of process methane equivalent. This value is specific for the embodiment shown in the herein specification and drawings, but actually is operable over a range of 40,000–62,000 B.t.u.'s per pound mole of process methane equivalent depending on the amount of methane reformed and the outlet CO to $CO_2$ ratio.

As shown in FIG. 1, the process in the secondary reformer is exothermic. This unit process (secondary reforming) develops about 37,000 B.t.u.'s per pound mole (based on 60° F. and zero pressure) of process methane equivalent available for recovery and use within the overall ammonia-forming process. This value is specific for the embodiment shown in the herein specification and drawings, but actually is operable over a range of 30,000–50,000 B.t.u.'s per pound mole of process methane equivalent. Heat is recovered from the secondary reformer effluent at a rate of about 80,000 B.t.u.'s per pound mole of process methane equivalent for energy conversion. This value is specific for the embodiment shown in the herein specification and drawings, but actually is operable over a range of 60,000–100,000 B.t.u.'s per pound mole of process methane equivalent. The water gas shift reaction which takes place in the shift converter is likewise exothermic. The shift converters provide, in the specific embodiment in FIGS. 2–5, about 10,000 B.t.u.'s per pound mole (based on 60° F. and zero pressure) of process methane equivalent available for heat recovery. Here again this value is variable and can be within the range of 5,000–18,000 B.t.u.'s per pound mole of process methane equivalent. Heat is recovered from the shift converter effluent stream at a rate of about 78,000 B.t.u.'s per pound mole of process methane equivalent for energy conversion. This value is specific for the embodiment shown in the herein specification and drawings, but actually is operable over a range of 60,000–100,000 B.t.u.'s per pound mole of process methane. As shown in FIG. 1, nitrogen and hydrogen are converted to ammonia in the ammonia converter. This unit process is exothermic and develops about 40,000 B.t.u.'s per pound mole (based on 60° F. and zero pressure) of process methane equivalent available for recovery and use. This value is also variable as determined by the process efficiency and can be within the range of about 30,000–50,000 B.t.u.'s per pound mole of process methane equivalent. Heat is recovered from the ammonia converter effluent stream at a rate of about 27,000 B.t.u.'s per pound mole of process methane equivalent for energy conversion. This value is specific for the embodiment shown in the herein specifications and drawings, but actually is operable over a range of 20,000–30,000 B.t.u.'s per pound mole of process methane. As shown in FIG. 1 the heat energy is collected and sent to a steam extraction turbine. In this particular instance this turbine generates 36,400 BHP, or about 16.95 BHP per pound mole of process methane per hour. Operably, however, this value can be within the range of 14.5–19.5 BHP per pound mole process methane per hour. This power is developed by charging to the turbine hot steam equivalent to 250,000 B.t.u.'s per pound mole of process methane per hour. While this value is specific for this embodiment, an operable range is 200,000–300,000 B.t.u.'s per pound mole of process methane per hour. The mechanical energy developed by the turbine is delivered to an electrical generator which in this specific instance, develops 26,000 kilowatts, equivalent to 12.1 kilowatts per pound mole of process methane per hour. An operable range suitable for use within the range above given in this discussion of FIG. 1, is 10–14 kilowatts per pound mole of process methane per hour.

In summary, the contributions of the various sections of the process to heat recovered for steam is substantially as follows:

| | Percent (approximate) |
|---|---|
| Ammonia synthesis | 10 |
| Shift converters | 28 |
| Primary reformer | 31 |
| Secondary reformer | 31 |
| | 100 |

Using the heat recovery systems herein described, enough electrical energy is generated also to drive the air compressors and the natural gas compressors and even so, there is electricity generated in excess of the needs of the plant. Electricity generated and consumed is shown below:

| | Brake horsepower | |
|---|---|---|
| Generated | | 36,400 |
| Requirements: | | |
| Synthesis gas section (compressors and pumps) | 20,685 | |
| Air compressors | 7,246 | |
| Natural gas compressors | 1,000 | |
| Total | | 28,931 |
| Excess electricity | | 7,469 |

With reference to FIG. 2, process natural gas enters at line 1 at a temperature of about 60° F. and at a pressure at about 550 p.s.i.g., and proceeds to sulfur absorber 3. On leaving the sulfur absorber it passes into the primary reformer flue where it is heated to 450° F. in heat exchanger 5. It is again passed into the primary reformer flue in heat exchanger 7, where its temperature is raised to 750° F. It then passes into chamber 9, which contains zinc oxide, which guards against sulfur passing through during up-set periods. After leaving the sulfur guard vessel 9, the hot natural gas is blended with process steam at 700° F. and at 550 p.s.i.g., in line 11. The blend then proceeds into the flue of the primary reformer in heat exchanger 13, where the temperature entering at 712° F., is increased to 900° F., while keeping the pressure at substantially 500 p.s.i.g. This hot vapor mixture now constitutes Stream 1, as the primary reformer feed, and conforms to the analysis given in Table 2. The primary reformer feed now enters the primary reformer 15, where the methane is converted to carbon oxides and hydrogen. The primary reformer effluent leaves the primary reformer at line 17, now at a temperature of 1,504° F. and at a pressure of 450 p.s.i.g., and having the composition as shown in Stream 2 of Table 2. This stream is now passed into the secondary reformer 19, along with air and additional steam prepared in the manner following. Steam at 700° F. and at 550 p.s.i.g. in line 23 is blended with air at 275° F. in line 21 to provide a vapor mixture having a final temperature of 297° F. in line 25.

The air-steam vapor mixture enters the flue of the primary reformer at 25, where the temperature is raised to 450° F., and then again at 27 where it is raised further to 900° F. At this point the vapor mixture has the composition shown in Stream 3 of Table 2, and in this form it enters the secondary primary reformer at 29. Streams 2 and 3 are now blended in the secondary reformer; and the methane of Stream 2 is largely burnt with oxygen in the air to form additional carbon oxides, as described in more detail elsewhere herein.

The effluent of the secondary reformer leaves the secondary reformer at line 31 and has the composition shown in Stream 4 in Table 2. This stream is now at 1,816° F. and at a pressure of about 446 p.s.i.g. This hot effluent from the secondary reformer enters secondary reformer waste heat boiler 33, in indirect heat exchange relationship with 1,500 p.s.i. condensate, thereby to extract 172.7 million B.t.u./hr. This has the effect of reducing the temperature of the stream to 700° F. The stream next enters secondary reformer boiler feed water heater 35, where its temperature is further reduced to 650° F. The effluent through line 37 enters the high temperature shift converter 39, where carbon monoxide is converted to carbon dioxide with formation of hydrogen. This reaction is exothermic and increases the temperature of the reaction mixture. The effluent from the high temperature shift converter leaves the converter at line 41 with composition designated as Stream 5 in Table 2, at a temperature of 759° F. This stream (turn now to FIG. 3) enters heat exchanger 43, where it gives a substantial amount of heat to the methanator stream and to boiler feed water. The effluent from the high temperature shift converter 39, now at 400° F., enters via line 45 the low temperature shift converter 47. In this vessel the water-gas shift operation is substantially completed, and the effluent of the low temperature shift converter leaves this vessel at line 49, now having the composition designated as Stream 6 in Table 2. This stream has a temperature of 424° F. and a pressure of 431 p.s.i.g. It enters the low temperature converter boiler feed water heater 51, wherein it heats boiler feed water from a temperature of 250° F. to a temperature of 320° F., and in the process the low temperature shift converter effluent falls to a temperature of 360° F. Its temperature is further reduced by passing it in heat exchange relationship through carbonate reboiler 53, where the temperature is decreased to 292° F. Further passage through condensate pot 55, heat exchanger 57, and condensate pot 59, reduce the temperature of the low temperature shift converter effluent to 245° F. At this point, through line 61, the low temperature shift converter effluent enters the carbon dioxide absorber 63. (This is a conventional potassium carbonate $CO_2$-absorber.) The effluent from the carbon dioxide absorber 63 leaves the absorber at line 65 and now has the composition shown as Stream 7 in Table 2. This stream is at temperature of 186° F. and has a pressure of about 414 p.s.i.g. This stream enters methanator heat exchanger 67, where it is again reheated, this time to a temperature of 550° F. This stream, as already mentioned, passes through methanator heat exchanger 43, where it is again heated, this time increasing its temperature to 600° F., at a pressure of 411 p.s.i.g. The hot stream now enters the methanator 71 via line 69, where residual carbon oxides are reconverted to methane to avoid contamination of the ammonia catalyst. The methanator effluent emerges from the methanator 71 at line 73, at a temperature of 636° F. and at a pressure of 409 p.s.i.g., and having a composition as shown in Stream 8 in Table 2. This stream is passed through methanator heat exchanger 67 to lower its temperature and to increase the temperature of the low temperature shift converter effluent. The methanator effluent leaving heat exchanger 67 now has a temperature of 262° F. This stream, via line 75, enters synthesis gas cooler 77, where its temperature is further decreased to 110° F. This stream now enters condensate pot 79 where condensed steam is removed, and it now passes via line 81, at a temperature of 110° F. and at a pressure of 409 p.s.i.a., to the ammonia synthesis gas compressors 83. It leaves the compressors at 85 at a temperature of 225° F. and at a pressure of up to 9,350 p.s.i.a. It now passes through the synthesis gas after-cooler 87, where cooling water reduces its temperature to 110° F. Hence it proceeds through oil filter 89, to remove traces of oil introduced by the compressors and from other extraneous sources. After leaving the oil filter it has a temperature of 110° F. and a pressure of 8,000 p.s.i.a. Now, via line 91, it enters the high pressure ammonia separator 93 (refer now to FIG. 4), where it is brought into direct contact with the effluent from the ammonia converter 97, and it emerges from high pressure separator 93 at line 95 at a temperature of 101° F. and at a pressure of 7,000 p.s.i.a.

The high pressure separator 93 operates in substantially the following manner. An ejector 94 is mounted on its top. The fresh feed (line 91) is mixed with the circulating stream. The ammonia in the circulating stream washes traces of carbon oxides and moisture out of the fresh feed and prevents them from going into the converter. The separator 93 separates out the liquid ammonia and it is removed via dip tube. The ammonia synthesis gas mixture composed chiefly of nitrogen and hydrogen is heated to about 300° F. by feed-product exchange with effluent from ammonia converter boiler feed water heater 101, before entering ammonia converter 97, where it is partially converted to ammonia. The feed-product exchanger is not shown on FIG. 4. The temperature within the converter in this instance is about 1,000° F., but can vary in the range of 700–1200° F. The ammonia converter effluent leaves the ammonia converter at line 99, at 500–700° F., suitably 653° F., and now has the mole percent composition of hydrogen 51.3, nitrogen 17.1, methane 5.8, argon (and noble gases) 5.3, and ammonia 20.5%. The effluent from the ammonia converter 97 must now be cooled.

As has been mentioned, cooling is accomplished with liquid water, and this operation suffices to condense the ammonia without refrigeration. Cooling suitably takes place in two or more stages. The converter effluent leaves the converter at a temperature of about 650° F. and preferably undergoes preliminary cooling, e.g., it is passed through ammonia converter boiler feed water heater 101, which brings its temperature down to about 467° F. It is then cooled to about 260° F. in the feed-product exchanger not shown. It is further cooled by ammonia condenser 103, using cooling water, to bring its temperature down to 108° F., while maintaining a pressure of 6,950 p.s.i.a.

Considerable variation is possible in these three cooling steps. For example, in the first step the converter effluent can be cooled to a temperature in the range of 400–550° F., and in the third, to a temperature in the range of 100–150° F. Two or more cooling steps can be used, the object being to reduce the temperature quickly, efficiently, and economically, from an exit temperature of 500–600° F., down to a temperature of 100–250° F. so that the ammonia component of the converter effluent will condense.

A total of 132 million B.t.u./hr. is extracted from the ammonia converter cooling operation, or 61,500 B.t.u./lb. mole of process $CH_4$. A suitable range is 50,000–70,000 B.t.u./lb. mole of process $CH_4$.

The ammonia, now in liquid form, leaves ammonia condenser 103 via line 105, which divides into lines 107 and 109. Line 107 proceeds through ejector 94 to high pressure separator 93, above described, whence the liquid ammonia emerges at line 111 at a temperature of 101° F. and at a pressure of 7,000 p.s.i.a. and with composition of Stream 9, Table 2, and then passes into low pressure ammonia separator 113. The liquid ammonia emerges from low pressure separator 113 at line 115 and at a temperature of 112° F. and at a pressure of 1085 p.s.i.a. It is further cooled by passing it through cooler 117, cooled with cooling water, where the temperature is reduced to 100° F. and the stream now has a pressure of 1085 p.s.i.a. This product is now product liquid ammonia and is ready for storage and sale. Returning now to line 109, this is combined with line 119 from the low pressure separator, as purge gas to go to the ammonia absorber. Fresh feed line 91 contains inerts such as $CH_4$ and argon which must be removed from the system continuously to keep the system in balance. Line 105 is purged through line 109 continuously to remove the inerts. The purge gas also carries some $NH_3$, $H_2$ and $N_2$ with it. The ammonia is recovered from the purge gas in the ammonia absorber. The $NH_3$-free purge gas is used for fuel in other parts of the plant.

Returning now to FIG. 3, and to carbon dioxide absorber 63, lean carbonate solution at 186° F. enters the absorber at line 121, and the carbon dioxide-rich carbonate solution liquid leaves the absorber at line 123, at 240° F. This stream passes into carbonate regenerator 125 where carbon dioxide is taken off overhead at 127, and the carbonate liquid, now freed of carbon dioxide, is recovered below at 129, heat is added to the circulating bottoms in carbonate reboiler 53, and pumped back to the carbon dioxide absorber 63 via carbonate pump 131 and carbonate solution cooler 133. The carbonate solution leaves the carbonate solution cooler 133, via line 121 and there enters the carbon dioxide absorber 63 as above described. Liquid condensate is recovered from the carbonate regenerator overhead stream by use of a regenerator overhead condenser 135. This provides additional separation of carbon dioxide from moisture, and serves to recover small amounts of the absorbent. The thus recovered solution is returned via line 137 to pump 131, whence it is sent on to carbonate solution cooler 133 as above described.

Returning now to FIG. 2 and to the primary reformer 15, it will be noted that waste heat in the flue above the catalyst section provides heat not only for the natural gas, steam, and air used as reactants in the process, but also provides the energy, directly or indirectly, for substantially all prime movers used throughout the process. This is done by heat exchange units for 1500 p.s.i. steam super heater, the 1500 p.s.i. steam boiler, the boiler feed water heater, as well as the heat exchanger for preheating the combustion air. As already mentioned, the indirect extraction of energy from the primary reformer flue (and to a lesser extent, the use of energy from the secondary reformer) is used to pressure the purified synthesis gas into the ammonia converter, as well as for a number of auxiliary purposes. It is the use of this energy conversion, especially for compressing the synthesis gas into the converter, that makes the invention commercially feasible.

The complete energy balance for the primary reformer is given in Table 1. For the particular conditions shown, fuel is provided at the rate of 479.6 million B.t.u./hr. This can be as natural gas, fuel oil, or as a mixture of these in any convenient proportion.

FIG. 5 shows in more detail the steam, condensate, and power balance. The process steam super heater enters the primary reformer waste heat boiler 15 at line 10. This process steam is recovered mainly from steam extraction turbine 141, which provides 36,400 BHP.

The total amount of steam generated is sent to the steam super heater 143. This is 380,101 lbs./hr., proceeding via line 139 through the heat exchanger provided in the primary reformer waste heat boiler 15, whence it emerges and is sent to high pressure steam super heater 143. From here it goes directly to extraction turbine 141. Extraction turbine 141, as noted, develops 36,400 BHP, and drives generator 145 developing 26,600 kilowatts. It is that generator that provides the electromotive power to drive the electric motors powering the reciprocating compressors which pressure the synthesis gas into the ammonia converter 97.

Returning to the high pressure steam super heater 143, it will be noted that this is heated by means of fuel gas. This fuel gas is adequate to provide 10.9 million B.t.u.'s per hour to the steam passing through the superheater.

In addition to providing power for the electrical generator, a majority of the residual steam from the extraction turbine 141 is available for powering auxiliary pumps, designated as deaerator feed pump 147, forced draft and induced draft turbines 149, carbonate pump turbines 151, high pressure boiler feed water pump turbines 153, and primary and secondary boiler pump turbines 155. Effluent from these pumps and turbines eventually goes to deaerator 157 and from thence is returned ultimately to line 161, where it enters heat exchange relationship with the primary reformer waste heat boiler 15. In making this return, it passes through high pressure boiler feed water pump 159, and either ammonia converter boiler feed water heater 101 or boiler feed water heaters, 51, 163, and 35. As has already been mentioned, a major portion of the stream of 203,314 pounds per hour leaving the extraction turbine 141, some of which as mentioned, proceeds to drive various pumps and turbines, 166,935 pounds per hour of the total proceeds to the process steam superheater via line 10.

A portion of the stream leaving pump 159 divides before it reaches ammonia converter boiler feed water heater 101. Part of the stream leaves through line 161 and passes through low temperature shift boiler feed water heater 51, then into high temperature shift boiler feed water heater 163, then into secondary reformer boiler feed water heater 35, and finally, at a temperature of 596° F. it enters steam drum 165. Steam drum 165 is fed by two sources of steam generation. The larger of these two sources is a stream of 310,444 lb./hr., which is generated in secondary reformer waste heat boiler 33. Condensate is recycled out of steam drum 165 by means of boiler circulator pump 169. The flow exit pump 169 is split, part going to secondary reformer waste heat boiler 33 and the remainder going to the primary reformer waste heat boiler 135. Boiler 135 generates 69,657 pounds per hour of steam which is returned via line 173 to the steam drum 165. The "blow down" from the steam drum leaves the steam drum via line 175 and enters blow down pot 177, where it is flashed into overhead steam at 179 and liquid water at 181. Line 179 carries the steam back to line 25 where it is reheated in the process steam superheater. Line 181 carries the condensate to flash drum 183, for further separation of flashed vapor and liquid. Liquid water condensate is taken off at bottom line 185. Overhead steam is taken out via line 187 and it is returned to the deaerator 157. A side stream 189 is diverted to the de-gasser unit 191, which vents overhead at 193 and which yields de-gassed condensate via line 195 to process condensate pump 197. Condensate from this pump is led via line 199 to heat exchanger 201, in which it heats incoming fresh water. Product from the heat exchanger 201 then proceeds into the water treatment section where it is passed through cation units 203 to demineralize it, and then is blended in demineralized water storage tank 205 with demineralized makeup water, to provide a total of 179,630 lb./hr. of treated water for the process. This blend of recycle and makeup water is pumped via pump 207 to treated water heater 201, thence to process condensate exchanger 209 and then to deaerator 157.

Returning to the extraction turbine 141, it will be noted that 176,787 lb./hr. of steam is taken from it and is passed to high pressure steam condenser 211, after which it is joined with the effluent from pumps 151 and 153 via line 213 passing through low pressure steam condenser 215, both of these streams merging at 217 to enter pump 219, which sends the combined stream to heat exchanger 221, wherein process gas gives up heat to the water. The heated water then proceeds via line 223 to deaerator 157.

Each of the individual unit processes involved in making synthesis gas and its conversion to ammonia in the process of this invention is old. Thus, the herein used system of steam-methane primary reforming is old, and has been described, for example, in U.S. Pat. 3,132,010. Secondary reforming as used herein is likewise old, and is described, for example, in the said U.S. patent and in Canadian Patent 753,173. The water-gas shift reaction as used herein is also well-known and is described in both the said patents. And the high-pressure conversion of nitrogen and hydrogen to ammonia by the herein-described process is similarly well-known. Catalysts for all these steps, including methanation, have been described in the literature, including the patents above cited. A wide range of suitable catalysts for each of the steps is available commercially and can be used in the unit processes involved in the herein invention. See thearticle on Ammonia in Volume 2, of Encyclopedia of Chemical Technology, Second Edition, Kirk-Othmer.

The essence of this invention does not lie in any given unit process for making ammonia synthesis gas or in its conversion to ammonia, but rather in the recovery of heat from the synthesis-gas-forming process, and its use in pressuring the synthesis gas into the converter at 5,000–15,000 p.s.i. Such pressures permit simple and cheap water cooling of the effluent to condense and recover the ammonia product. This combination is believed novel.

What is claimed is:

1. In the preparation of ammonia from feedstock comprising hydrocarbon, water, and air, through operations including primary reforming of said hydrocarbon with steam to provide an effluent comprising unreacted hydrocarbon, unreacted steam, hydrogen, and carbon oxides; and secondary reforming of said effluent with air to provide an effluent comprising unreacted steam, carbon oxides, hydrogen and nitrogen; reacting the carbon monoxide in said secondary reformer effluent with water in a water-gas-shift reaction to form a crude ammonia synthesis gas containing additional hydrogen and carbon dioxide; and purifying said crude synthesis gas and charging it to an ammonia converter under pressure; the improvement comprising extracting heat from said primary and secondary reforming and water shift and ammonia converter operations to power a steam turbine driving a generator generating electrical energy to drive an electrical motor which in turn drives a reciprocating compressor which in turn compresses said purified synthesis gas feed for charging to said ammonia converter.

2. The method according to claim 1 comprising:
(a) applying heat equivalent to about 200,000–300,000 B.t.u./hr./lb. mole process $CH_4$ to an endothermic steam-methane primary reforming process;
(b) recovering substantially half of said applied heat; conducting a secondary reforming process in which methane in the effluent of the primary reforming process is burnt to CO and $CO_2$ with an oxygen-containing gas and recovering about 60,000–100,000 B.t.u./hr./lb. mole of process $CH_4$ from the secondary reformer effluent; subjecting the secondary reformer effluent to a water-gas shift reaction to provide a shift effluent comprising principally $N_2$, $H_2$, and $CO_2$, recovering about 60,000–100,000 B.t.u./hr./lb. mole of process $CH_4$ from the water-gas-shift effluent; and recovering about 20,000–30,000 B.t.u./hr./lb. mole of process $CH_4$ from the ammonia converter;
(c) removing $CO_2$ from the shift effluent;
(d) providing a purified ammonia synthesis gas; compressing said ammonia synthesis gas into an ammonia converter at a pressure in the range of about 5,000–15,000 p.s.i. by means of a reciprocating compressor, said compressor being driven by an electrical motor using electrical energy generated by steam extraction turbine driven by steam from waste heat boilers heated by heat derived from (a) and (b) above; said derived heat so used being about 200,000–300,000 B.t.u./hr./lb. mole process $CH_4$, thereby to provide about 14.5–19.5 brake horsepower per lb./mole of process $CH_4$ in the steam extraction turbine which in turn provides about 10–14 kilowatts per lb./mole of process $CH_4$ in the electrical generator;
(e) forming ammonia from the synthesis gas thereby to provide a vapor mixture comprising ammonia and unreacted synthesis gas at about 5,000–15,000 p.s.i. and having a temperature of about 700–1200° F. inside the converter;
(f) cooling the vapor mixture by indirect contact with liquid water to a temperature of about 100–250° F. to condense the ammonia;
(g) and recovering the condensed ammonia.

3. The method according to claim 2 comprising:
(a) applying heat equivalent to about 220,000 B.t.u./hr./lb. mole process $CH_4$ to an endothermic steam-methane primary reforming process;
(b) recovering at least substantially half of said applied heat; conducting a secondary reforming process in which methane in the effluent of the primary reforming process is burnt to CO and $CO_2$ with an oxygen containing-gas and recovering about 80,000 B.t.u./hr./lb. mole of process $CH_4$ from the secondary reformer effluent; subjecting the secondary reformer effluent to a water-gas shift reaction to provide a shift effluent comprising principally $N_2$, $H_2$, and $CO_2$, recovering about 80,000 B.t.u./hr./lb. mole of process $CH_4$ from the water-gas shift effluent; and recovering about 27,000 B.t.u./hr./lb. mole of process $CH_4$ from the ammonia converter;
(c) removing $CO_2$ from the shift effluent;
(d) providing a purified ammonia synthesis gas; compressing said ammonia synthesis gas into an ammonia converter at a pressure in the range of about 5,000–15,000 p.s.i. by means of a reciprocating compressor, said compressor being driven by an electrical motor using electrical energy generated by a steam extraction turbine driven by steam from waste heat boilers heated by heat derived from (a) and (b) above; said derived heat so used being about 250,000 B.t.u./hr./lb. mole process $CH_4$ thereby to provide about 17 brake horsepower per lb./mole of process $CH_4$ in the steam extraction turbine which in turn provides about 12 kilowatts per lb. mole of process $CH_4$ in the electrical generator;
(e) forming ammonia from the synthesis gas thereby to provide a vapor mixture comprising ammonia and unreacted synthesis gas at about 7,000 p.s.i. and having a temperature of about 650° F.;
(f) cooling the vapor mixture by indirect contact with water to a temperature of about 108° F. to condense the ammonia;
(g) and, recovering the condensed ammonia.

References Cited

UNITED STATES PATENTS

| | | | | |
|---|---|---|---|---|
| 2,610,106 | 9/1952 | Gray | | 23—199 |
| 3,403,000 | 9/1968 | Hennel | | 23—199 |

OTHER REFERENCES

Baumeister: "Power and Power Machinery," Chemical Engineers' Handbook, third edition, edited by John H. Perry, p. 1628, McGraw-Hill Book Company, Inc., 1950.

EARL C. THOMAS, Primary Examiner

H. S. MILLER, Assistant Examiner

U.S. Cl. X.R.

23—289